United States Patent [19]

Van der Vos et al.

[11] Patent Number: 5,045,189

[45] Date of Patent: Sep. 3, 1991

[54] MAGNETIC SEPARATION APPARATUS

[75] Inventors: Geert Van der Vos, Gelrestraat; Rint Boersma, Zandsestraat, both of Netherlands

[73] Assignee: Smit Transformatoren B. V., Nijmegen, Netherlands

[21] Appl. No.: 442,774

[22] Filed: Nov. 28, 1989

[51] Int. Cl.[5] .............................................. B01D 35/06

[52] U.S. Cl. .................................... 210/184; 210/223; 210/438; 210/440

[58] Field of Search ............... 210/222, 223, 695, 175, 210/184, 186, 438, 439, 440, 443, 185; 209/222.3, 232; 55/100

[56] References Cited

U.S. PATENT DOCUMENTS

| | | | |
|---|---|---|---|
| 3,059,910 | 10/1962 | Morita | 210/222 |
| 3,227,280 | 1/1966 | Hathaway et al. | 210/438 |
| 4,472,275 | 9/1984 | Yano | 210/223 |
| 4,505,824 | 3/1985 | Akamine et al. | 210/223 |

FOREIGN PATENT DOCUMENTS

| | | | |
|---|---|---|---|
| 548232 | 11/1957 | Canada | 210/223 |
| 717944 | 11/1954 | United Kingdom | 210/223 |

*Primary Examiner*—W. Gary Jones
*Attorney, Agent, or Firm*—Wegner, Cantor, Mueller & Player

[57] ABSTRACT

A magnetic separation apparatus is described, which is primarily intended for separating magnetic particles contained in a fluid. Such apparatus is primarily used in the process of sewage purification by binding magnetic particles to the substance to be removed, and by applying a magnetic filter. The invention resides in the fact that the channel for supplying the liquid to be treated has such a shape that part of the substance to be separated already precipitates before reaching the actual magnetic filter. This avoid the quick filling of the magnetic filter thus extending periods between rinsing the filter. By applying a relatively weak field in the area in which precipitation takes place, precipitation is enhanced.

19 Claims, 1 Drawing Sheet

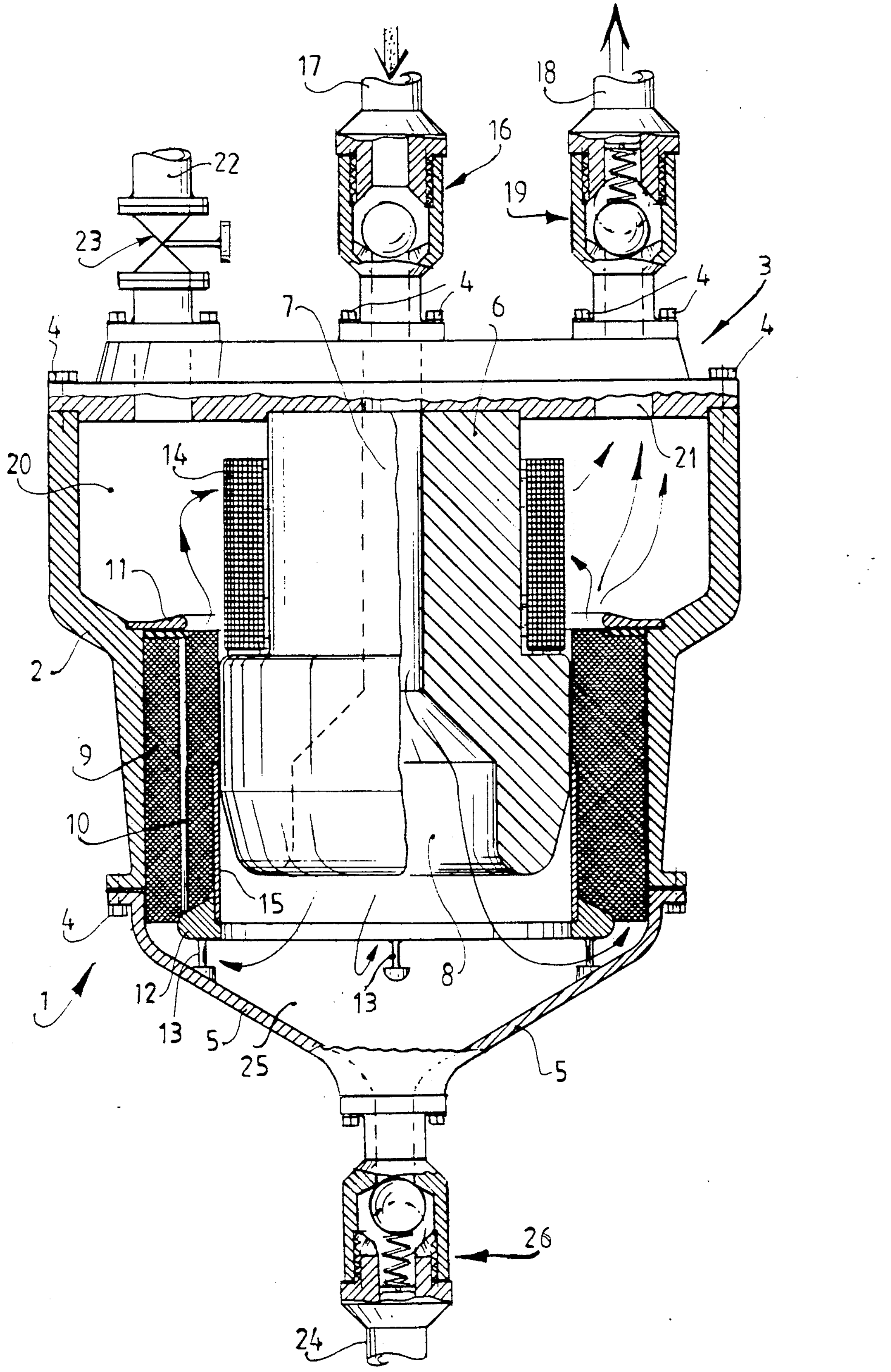
17
18
16
22
19
23
3
4
4
4
4
7
6
4
14
20
21
11
2
9
10
15
4
12
13
8
13
1
13
5
25
5
26
24

MAGNETIC SEPARATION APPARATUS

The present invention relates to a magnetic separation apparatus, comprising a supply channel, a magnetizable filter and a discharge channel.

Such a magnetic separation apparatus is known from the American patent specification U.S. Pat. No. 4,472,275.

In this known apparatus the liquid, from which magnetizable parts have to be separated, is supplied from underneath through a supply channel to a magnetizable filter. The filter comprises two parts. After filtering the cleaned liquid is discharged through a discharge channel. Thus, only the magnetizable filter is working in the separation process.

Such a known apparatus suffers from the disadvantage that the filter provided therein fills up quickly, and so has to be rinsed frequently, which disturbs the normal process, so that the effective use of this apparatus is impaired. Of course this can be avoided by the application of a larger filter, but a larger filter means greater volume and greater exitation power to excite the electromagnet, and this is not advantageous either.

The aim of the present invention is to provide such a magnetic separation apparatus, in which—while maintaining a magnetizable filter with limited dimensions—the intervals between rinsing actions can be extended substantially.

This aim is reached by shaping the supply channel such that at least a part of the material to be separated precipitates prior to passing through the filter.

By these features already a part of the material to be separated is separated from the liquid, so that the liquid passing through the filter has a more limited amount of material to be separated. This prevents the filter from filling up quickly, so that the intervals between the rinsing of the filter can be extended substantially.

Subsequently, the present invention will be elucidated with the help of the accompanying drawing, showing a schematic view, partly in cross-section, of an apparatus according to the present invention.

The magnetic separator comprises a vessel 1, of which the outer wall is rotation-symmetric. The upper part of the wall 2 of the vessel is cylindrical, the adjacent lower part is conical, while the part underneath is again cylindrical. At the upper side the vessel 1 is closed by a circular cover 3. The cover 3 is fixed to the wall of the vessel by means of bolts 4. The vessel 1 is closed at its lower side by a substantially conical lower part 5, which is again connected with the wall 2 of the vessel by means of bolts 4. This lower part encloses a chamber 25.

A core 6 is fixed relative to the middle of the cover 3, which again is coaxial relative to the wall of the vessel. A channel 7 is provided in the middle of the core. The lower side of the channel 6 is widened, so that a chamber 8 is obtained.

A substantially annular filter 9 is provided between the core 6 and the lower part of the wall of the vessel 2, which is composed of a magnetizable grid having small apertures. The lower half of the filter encloses an annular wall 10. The filter is deliniated at its upper side by a fixation ring 11, whereas the filter is fixed at its lower side by a fixation ring 12 extending substantially along the inner side underneath the filter 9. This fixation ring 12 is fixed to the conical lower part 5 by means of support 13. Both fixation rings 11, 12 are drawn towards each other by means of rods 15, so that the filter 9 is enclosed.

A coil 14 is provided around and directly adjacent the core for excitation of the magnetic circuit has been provided around the core and directly adjacent to. Of course, this coil 14 comprises connection leads not shown in the drawings for excitation of the coil.

The magnetic circuit comprises the core 6, the cover 3, the wall 2 of the vessel, the filter 9 and the conical lower part 5. When exitation of the coil 14 takes place, a magnetic field is generated within the filter 9, with the help of which the magnetic separation is executed. The magnetic circuit is dimensioned such that an effective magnetic field is established with a high gradient with the filter 9. This high gradient is also due to the small dimensions of the apertures of the grid. The core 6 has such a shape that the edges at the lower side thereof are rounded-off, so that the required smaller gradients in the field are generated. Thus the chambers 25 and 8 act as a magnetic filter with a small field gradient.

A supply channel 17 for supplying liquid to be cleaned is connected with a channel 7 extending through the core 6 through a one-way valve 16. In the present embodiment the one-way valve 16 is implemented as a ball valve, but it is also possible to implement this in another way. The one-way valve 16 is again connected with the cover 3 by means of bolts 4.

A discharge channel 18 is connected with the substantial annular chamber 20 located between the cover 3, the wall 2 of the vessel, the closing ring 11, the filter 9, the coil 14 and the core 6 by means of a biased valve 19 and a channel 21 provided in the cover 3.

By means of a channel 22 and a controllable valve 23 the annular chamber 20 is also connected with a vessel not depicted in the drawing, in which air or another gas has been stored under a high pressure.

Finally the chamber 25 is connected with a discharge channel 24 for rinsing water by means of an aperture provided in the conical lower part 5 and a biased valve 26.

This magnetic separation apparatus according to the present invention is used according to the following description: Initially the coil 14 is switched on, so that the magnetic circuit is excited and the filter 9 is magnetized with a high gradient and in the chambers 8 and 25 are magnetized with a low gradient. Subsequently the liquid to be cleaned is supplied through the channel 17, the one-way valve 16 and the channel 7 to the chamber 8. In order to clean by means of magnetic separation, the pollution has to be composed of magnetizable parts or has to be united with magnetizable material.

By the two stage widening of the supply channel 7, i.e., before chamber 8 and before chamber 25, a speed reduction of the liquid is achieved, which will cause part of the pollutions to precipitate prior to being filtered through filter 9 and to end up on the sloping wall of the conical lower part 5. Also a change of direction of the liquid takes place, which will also cause precipitation.

A magnetic field with a low gradient is present within the chambers 8 and 25, so that precipitation will also occur as a consequence of the action of this magnetic field. Thus, the action of the filter with a low gradient is combined with the action of gravity. Subsequently the liquid is fed through the filter 9. As a consequence of the high gradients of the magnetic field present within the filter 9, the magnetizable parts will adhere to the filter, so that the cleaned liquid enters in the chamber 20 and is discharged through the channel 21, the valve 19 and the discharge channel 18. This process can be maintained until the filter 9 is completely filled up with magnetizable parts.

Subsequently the coil 14 is switched off to cancel the magnetization of the filter 9 and of the chambers 8 and 25. It may be necessary to excite the magnet in the opposite direction for a short period to compensate for remnant magnetism. Then compressed air is supplied, preferrably under as high a pressure as possible through the controlled valve 23 and the channel 22, so that the one-way valves 16 and 19 will close. As a consequence thereof, the liquid present within the chamber 20 will be pressed through the filter with a high force and speed, taking the pollutions left behind during the magnetization of the filter with it.

Experience has indicated that the amount of liquid present in the annular chamber 20 is sufficient to rinse the whole annular filter 9. The rinsing liquid, which is strongly polluted, is carried off through the wall of the conical lower part 5, through which the material precipitated locally is also carried away through the biased one-way valve 26, which will open now, and through the discharge channel 24.

Subsequently the valve 23 is closed and the annular chamber is aired through an airing valve not depicted in the drawing, after which the coil 14 can be switched on again and the whole process can start over again.

In dimensioning the apparatus according to the invention, the fact that the coil 14 has been provided such that it is cooled through the cleaned liquid is taken into account. A secondary consequence thereof is that pollution of the coil is avoided.

Only through the combination of the functions of the pressure vessel and the magnetic circuit in the wall of the vessel is it possible to create an annular room, which is fit to withstand pressure, such that the rinsing process can be executed with the help of the water stored in the annular chamber 20 and the gas pressure.

By easily loosenable bolt connections between the wall 2 of the vessel and the conical lower part, the wall 2 of the vessel, the cover and the core 7 can be moved upwardly so that the filter can be inspected easily. Of course, it is also possible to move the filter together with the conical part downward.

For detecting the degree of filling of the filter, it is possible to provide a detection apparatus.

Instead of the one-way valve described in the present embodiment, it is of course possible to employ controllable valves, together with a suitable controlling device.

We claim:

1. A magnetic separation apparatus for separating material from a liquid comprising:

a vessel;

means for supplying the liquid to said vessel, said means including a core defining a channel disposed within said vessel;

a magnetizable filter disposed within said vessel; and a discharge channel;

wherein said core defining said channel is shaped such that the liquid is subjected to speed variations such that at least a part of the material to be separated precipitates prior to the liquid being passed through the filter.

2. Magnetic separation apparatus according to claim 1, wherein the magnetizable filter comprises a part in which a magnetic field with a low gradient is present and comprises a part in which a magnetic field with a high gradient is present.

3. Magnetic separation apparatus according to claim 2, wherein the part of the filter in which a lower gradient is present includes a chamber in which the precipitation takes place.

4. Magnetic separation apparatus according to claim 3, wherein said channel defined by said core is widened upstream of the filter.

5. Magnetic separation apparatus according to claim 3, wherein the apparatus is arranged rotation-symmetric with said channel defined by said core coaxial relative to an electromagnet and a storage vessel, and wherein part of said channel defined by said core in which the precipitation is developed includes a substantially cone-shaped chamber.

6. Magnetic separation apparatus according to claim 2, further comprising means for rinsing the filter and the chamber in which at least a part of the material to be separated is precipitated in the opposite direction.

7. Magnetic separation apparatus according to claim 2, wherein the filter is magnetized by an electromagnet which is arranged such that it is cooled by the liquid to be processed or already processed.

8. Magnetic separation apparatus according to claim 1, wherein said channel defined by said core is widened upstream of the filter.

9. Magnetic separation apparatus according to claim 1, wherein said channel defined by said core upstream of the filter is shaped such that the liquid to be separated is submitted to a change of direction of movement.

10. Magnetic separation apparatus according to claim 1, further comprising means for rinsing the filter and the chamber in which at least a part of the material to be separated is precipitated in the opposite direction.

11. Magnetic separation apparatus according to claim 10, wherein the means for rinsing comprises a storage vessel located in the discharge channel downstream of the filter, a one-way valve provided in the discharge channel further downstream and an apparatus for supplying compressed air.

12. Magnetic separation apparatus according to claim 10, wherein the apparatus is arranged rotation-symmetric with said channel defined by said core coaxial relative to an electromagnet and a storage vessel, and wherein part of said channel defined by said core in which the precipitation is developed includes a substantially cone-shaped chamber.

13. Magnetic separation apparatus according to claim 1, wherein the filter is magnetized by an electromagnet which is arranged such that it is cooled by the liquid to be processed or already processed.

14. Magnetic separation apparatus according to claim 13, wherein the coil of the electromagnet is cooled by the liquid being present in the vessel.

15. Magnetic separation apparatus according to claim 13, wherein the means for rinsing the filter comprises a storage vessel located in the discharge channel downstream of the filter, a one-way valve provided in the discharge channel further downstream and an apparatus for supplying compressed air.

16. Magnetic separation apparatus according to claim 1, wherein the apparatus is arranged rotation-symmetric with said core defining said channel coaxial relative to an electromagnet and a storage vessel, and wherein part of said channel defined by said core in which the precipitation is developed includes a substantially cone-shaped chamber.

17. Magnetic separation apparatus according to claim 16, wherein the wall of the apparatus acts at least partially as a magnetic circuit.

18. Magnetic separation apparatus according to claim 17, wherein the wall of said channel defined by said core acts at least partially as a magnetic circuit.

19. Magnetic separation apparatus according to claim 16, wherein the wall of said channel defined by said core acts at least partially as a magnetic circuit.

* * * * *